3,649,524
METHOD FOR REFORMING PARAFFINIC AND NAPHTHENIC RICH HYDROCARBON FEED STREAMS
Walter R. Derr, Ashland, and Francis E. Davis, Jr., West Deptford, N.J., assignors to Mobil Oil Corporation
No Drawing. Filed Sept. 30, 1969, Ser. No. 862,517
Int. Cl. C10g 35/08
U.S. Cl. 208—139                                          4 Claims

ABSTRACT OF THE DISCLOSURE

A reforming process is described wherein a platinum reforming catalyst comprising in the range of from about 0.15 up to about 1.0 weight percent of platinum in combination with a metallic reaction modifier and controlled catalyst acid activity is found to be a most unusually effective reforming catalyst at least with respect to maintaining the hydrogen purity of the recycle gas, product selectivity and yield octane rating of a reformed naphtha by controlling the chloride and/or water (moisture) atmosphere of the catalyst within particular limits.

BACKGROUND OF THE INVENTION

Reforming with platinum-aluminum catalyst now constitutes one of the major petroleum processing routes for upgrading naphthas to higher octane gasoline product. With the need to process relatively large volumes of naphthas, maintaining hydrogen purity of the reformate recycle gas in combination with gains in reformate product yields permits substantial savings in cost. For example, a reformate yield increase of as little as about 0.5% by volume represents an annual savings of several millions of dollars to the refining industry. Furthermore, any reduction in the amount of platinum required in a reforming catalyst, thereby reducing significantly the drain on our platinum reserves, or increase in on stream operating time before regeneration is necessarily accompanied by substantial costs savings amount to several millions of dollars.

The present invention is concerned in one aspect with improving upon a reforming operation whether employed in a regenerative and semi-regenerative or non-regenerative system. However the improvement obtained by the present invention encourages operating essentially in the category of a non-regenerative reforming operation without suffering adverse losses with respect to platinum utilization, hydrogen purity of recycle gases and reformate product selectivity yields of desired octane rating.

There have been several disclosures in the prior art directed to the effect of moisture on a reforming operation employing platinum metal catalysts. For example, in U.S. Patent 2,772,217 the patentees teach that reforming catalysts comprising oxides or sulfides of metals of groups IV, V, VI, VII and VIII after regeneration thereof contain from about 0.2 to about 1.0% water by weight. These patentees recommend further that the regenerated catalyst be dried to a moisture content in the range of from about 0.1 to 0.8% by weight in a stripping zone. However, it is known at this stage of the art that the moisture content of a reforming reactor is not necessarily limited to that provided by the catalyst as the sole source of moisture.

In U.S. Pat. No. 2,842,482 a reforming method is described in which the recycle gas contains about 0.5% by volume of water. This amount of water alone, however, will contribute to a partial pressure of water vapor of about 10 mm. of mercury at a total reactor pressure of about 54 p.s.i.g. and about 44 mm. of Hg at a total reactor pressure of about 200 p.s.i.g. A relatively dry or desiccated reforming operation has been described in the prior art as one in which the moisture content of the effluent recovered from the last reaction zone expressed as partial pressure of water at 200 p.s.i.g. total pressure is found to be less than 0.4 mm. of Hg and preferably from about 0.05 to about 0.2 mm. of Hg.

In the prior art of U.S. Patent 3,234,120 there is also described a reforming operation at pressures below about 400 p.s.i.g. wherein it is desired to maintain the catalyst surface area above about 200 square meters per gram by a control of the water or moisture level encountered by the catalyst during reforming, regeneration and start up operation with the catalyst. In this prior art patent reference it is explained that there are at least three sources of water supply which contact the catalyst in the reforming reaction zones. One source of water is due to that found in the charge naphtha which may contain from about 0 up to 100 parts per million of water. A concentration of 15 p.p.m. of water in the charge naphtha is found to contribute about 0.08 mm. of Hg to the total partial pressure of water in the reaction zone when at a total reaction zone pressure of about 200 p.s.i.g. An undried recycle gas, on the other hand, will easily build this water pressure contributed by the naphtha charge up to 0.5–2.0 mm. Hg partial pressure. In addition, it is to be noted that this prior art patent suggests that this amount of water in the reaction zone vapors is not recognized as adversely effecting the activity of platinum group metal reforming catalyst. However, it should be noted that it does produce a lower yield of $C_{5+}$ reformate by volume from a $C_5$ to 250° F. end point feed than when the partial pressure of the final effluent of the reforming zone is maintained within the range of from about 0.05 to about 0.2 mm. Hg. It will also be observed upon close examination that the information provided by this patent is derived from the use of a catalyst comprising 0.6 weight percent of platinum on an alumina support combined with up to about 0.7% by weight of chlorine.

In the prior art of U.S. Patent 3,110,703 which relates to reforming in the presence of a platinum alumina catalyst, there is explained that the chlorine content of the catalyst in at least the initial catalytic reaction zone tends to accumulate and increase to an undesirable amount tending to promote hydrocracking. This obviously unsatisfactory condition may be overcome however by limiting the surface area of the catalyst employed to levels of from about 1 to about 300 square meters per gram and preferably from about 9 to about 130 square meters per gram. At these levels it is alleged that the halogen pick up or increased hydrocracking activity of the platinum alumina catalyst is substantially lessened by avoiding excessive chlorine levels and thus excessive hydrocracking of naphthene in the first reforming zone.

In the prior art of U.S. Patent 2,952,611 there is defined a regenerative platinum catalyst reforming process wherein the desirability of maintaining moisture levels below about 100 p.p.m. is discussed by the combination of feed driers, recycle gas driers, regeneration gas driers and other means for obtaining and retaining the desired moisture level. It is to be particularly noted however that this patent particularly identifies that at moisture levels below 100 p.p.m. (parts per million) that a very rapid and surprising increase of reformate yields is attained when processing naphthenic Gulf Coast naphthas in the presence of platinum catalyst having a platinum content in the range of from about 0.3 to about 0.6 weight percent when in combination with halogen at a level in the range of from about 0.5 to about 1.5 weight percent. This patent also emphasizes that the super dry operation substantially eliminates a condition of halogen stripping during the on-stream oil cycle and thus assures substantially constant halogen level and a maximum on yields.

SUMMARY OF THE INVENTION

It has now been found that noble metal reforming catalyst promoted with metallic modifiers and referred to as bimetallic reforming catalysts may be employed in reforming operation at pressures in the range of from about 50 to about 600 p.s.i.g. and will perform most advantageously provided that the moisture level of the catalyst atmosphere is limited to within relatively narrow limits of from about 5 p.p.m. to about 25 p.p.m. of water and preferably from about 8 to about 20 p.p.m. of water. It has been further discovered that the $H_2$ purity of the reformate recycle gas responds as a function of the moisture content or level of the catalyst atmosphere during the reforming operation so that outside the above identified limits on water concentrations there is a significant drop-off in the catalyst effectiveness for maintaining hydrogen purity of the reformate recycle gas. It has also been found as a part of the preferred operation that when the moisture level falls outside the preferred limits in the reformate gaseous effluent one will encounter a reduction in product yields and catalyst stability.

This phenomenon of limited water concentration to stimulate platinum catalytic reforming operation in a manner to improve the hydrogen concentration or hydrogen purity of the recycle gas and $C_{5+}$ reformate product yield was the subject of a copending application Ser. No. 639,132, filed May 17, 1967 now Patent No. 3,374,026. It has been found in accordance with this invention that an improvement can also be realized with bimetallic type reforming catalysts when carefully controlling the water concentration of the atmosphere coming in contact therewith.

In addition to the improvements obtained with careful moisture control on the bimetallic catalysts it has been found that a halogen promoted catalyst composition can also be further improved upon by controlling the level of chloride in contact with the reforming catalyst during on stream reforming operations at a level which exceeds that normally thought practical. It is discussed in U.S. Patent 2,952,611 that water addition in the presence of a halogen containing catalyst may be used to suppress hydrocracking from which it was concluded that super dry reforming conditions should be employed. These super dry conditions were considered to be commensurate with maintaining the total water in the reaction system continuously and substantially below about 100 p.p.m. (parts per million), preferably below 50 p.p.m. and optionally below about 20 p.p.m. based on the charge stock. This patent further suggests that for optimum reforming operations, the halogen level of the catalyst should be maintained at some predetermined level within the range of about 0.5 to 1.5 weight percent, e.g. 1.0 weight percent and should preferably be maintained constant throughout the entire cycle of each reactor. The super dry reforming conditions recommended by this patent are alleged to eliminate undesired halogen stripping during the oil cycle and thus assure substantially constant halogen level.

It has now been found and in accordance with this invention that a bimetallic type of reforming catalyst such as for example a platinum-rhenium reforming catalyst promoted with chlorine can be operationally enhanced by maintaining a specific moisture controlled operation so as to provide from about 5 to about 25 p.p.m. of water in contact with the catalyst during reforming as measured in the hydrogen containing recycle gas effluent obtained therefrom and this enhancement can be further significantly improved with respect to product yield and octane rating of the liquid product over the water controlled operation provided one controls the chloride level beyond limits suggested by the prior art. In a more particular aspect, it has now been found that to reap the full advantages of a bimetallic reforming catalyst such as a chlorine promoted platinum-rhenium reforming catalyst that in addition to exercising a limited water control, an amount of chloride should also be present in the reactants to the reforming operation and this amount will be in excess over that required just to maintain a given chlorine level on the catalyst. The chloride level to be employed in accordance with this invention is particularly related to the moisture level and regulated to maintain a chloride to water ratio of .05 to about 1 and preferably the ratio should be at least about 0.1 to 0.5. This ratio provides a chloride level which exceeds that known or disclosed in the prior art for use in a reforming operation employing bimetallic catalysts. In a specific embodiment a desired ratio may be had by maintaining 4.0 p.p.m. by weight of chloride in the naphtha charge for every 10 p.p.m. by volume of water in the reformate recycle gas.

In the method of this invention the halogen or chloride level of the catalyst is maintained during its on-stream operation by the addition of such materials in the required excess such as by liquid organic chlorides added to the naphtha charge in such amounts as will provide the chloride to water ratios above identified. Thus from about 0.5 up to about 10 p.p.m. by weight of chloride may be combined with the naphtha charge as the optimum water level in the range of about 5 to about 20 p.p.m. by volume is maintained.

In one particular embodiment of the present invention, it is contemplated exercising control over the chloride level of the catalyst beds in a multiple bed catalytic reforming operation and the atmosphere in which employed by adding chloride for example to the reactants downstream of an initial reforming catalyst bed or beds arranged in the reforming reactor system. That is chloride may be combined with or injected into the reactants after the first catalyst bed or reactor zone and prior to the reactants entering the second catalyst bed or second reactor of the series of reforming reactors. Water or moisture control of the operation on the other hand will be exercised over all catalyst beds and particularly the reactants passed to the first catalyst bed to maintain the limits herein preferred. Reforming operations controlled as provided by the present embodiment permit exercising a control of the distribution of chloride on the catalyst in each catalyst bed or reactor and thus a control on the extent of isomerization and hydrocracking encountered in the reforming operation.

It has been found further that chlorination of the catalyst after regeneration is not by itself enough to maintain the catalyst at its optimum chloride level. Thus one needs to maintain a continuous chloride addition within the particularly defined specific ranges in combination with the limited water addition herein defined to reap the full benefits of the product improvement advantages obtained by the combined operation of this invention. This does not mean to say, however, that the controlled chloride addition above defined is to take the place of or may be substituted for a separate chlorination treatment of the catalyst after regeneration. On the contrary, maintaining control on the moisture level contacting the catalyst during regeneration and subsequent reduction thereof as well as chlorination of the reduced catalyst should be practiced with caution so that activity and selectivity characteristics of the catalyst will not be destroyed.

In a semi-regenerative or infrequent regeneration reforming operation it is important to limit the level of water in contact with the catalyst during regeneration so that surface area damage to eta-gamma alumina based catalyst and structure of the metal activators will be held to a minimum.

The method of reducing the regenerated catalyst and effecting start up in preparation for contact with naphtha charge under reforming conditions is an important part of the operation of this invention. The essence of the procedure after regeneration employed with advantage in an operation of this invention is directed to effecting reduction of the catalyst and start-up by naphtha addition in a minimum of time not exceeding from about 10 to about 15 hours duration. This procedure is effected in a gasiform atmosphere which permits rapidly raising the temperature of the catalyst mass to about 900° F. while increasing the hydrogen atmosphere concentration. In this start-up operation, it has been found that the time the catalyst is exposed to relatively high levels of moisture supersedes and takes precedence over control of the moisture level during this phase of the operation. Thus bringing the catalyst as rapidly as possible to an on-stream condition in a reduced state effectively operates to eliminate the need for a strict moisture control during this phase of the operation. When required, presulfiding of the catalyst may be accomplished during this phase of the operation and before contacting with naphtha charge.

The present invention resides particularly in the finding that a bimetallic noble metal reforming catalyst of relatively low metals content and promoted with halogen operated under carefully selected conditions of moisture and chloride level will perform operationally under more highly selective conditions by improving upon the hydrogen purity of the recycle gas and reformate product yields for an extended on-stream period. More specifically, it has been found that when operating according to this invention, the hydrogen purity of the recycle gas and the liquid reformate product yields may be maintained at higher values for an operational period of extended duration which significantly exceeds that heretofore possible with either paraffinic or relatively wide boiling range naphtha charge stocks. This significant processing breakthrough with the halogen promoted bimetallic platinum reforming catalysts has been found to be particularly effective provided that the moisture or water level is maintained during the reforming operation within the relatively narrow limits herein defined. A further significant advantage can also be realized provided that the chloride level of the catalyst and atmosphere within which it functions is also controlled with the limits herein defined.

In order to achieve the significant and unpredictable benefits described herein one needs to take particular notice of the contributing sources of water and halogen encountered in the reforming operation and during regeneration of the halogen containing catalyst. Accordingly, the level of water and halogen, particularly water, may be effectively controlled within preferred limits by one or more of a combination of feed driers, recycle gas driers and in some cases, regeneration gas driers when effecting regeneration of the catalyst. Thus in order to enjoy the benefits of the present invention it is preferred to dry the recycle gas rich in hydrogen down to a value below about 5 p.p.m. water and preferably below about 2 p.p.m. water before combining the thus dried recycle gas with a dry naphtha charge stock to be reformed. In the method of the present invention it is preferred to add water in amounts sufficient for controlling the moisture level of the reforming operation within the relatively narrow limits herein defined. At this time, the halogen to water ratio is also maintained or controlled so that the multiple benefits of these combined controls can be realized to their maximum benefits.

Generally, a naphtha reforming charge boils in the range of from about $C_5$ to $C_6$ boiling hydrocarbons up to an end boiling point (E.B.P.) in the range of from 180° F. or 290° F. up to about 320° F. or 360° F. and sometimes the naphtha charge may have an end point as high as about 400° F. The moisture control of this invention is facilitated in large part by drying the naphtha charge to a very low level so that the moisture-halogen level of the finally combined recycle gas-naphtha charge can then be adjusted by the controlled addition of water and halogen for relatively uniform dispersion in the total charge to the reforming operation. For the purpose of clarification it should be noted that water has been found to be soluble in the naphtha charge up to about 100 p.p.m.

This level of water solubility however is considerably higher than that required to receive the particular benefits of the present invention and this serves to emphasize the critical limits to which the present invention is directed.

During an on-stream reforming operation comprising charging a naphtha feed of narrow or wide boiling range combined with hydrogen rich recycle gas, it is preferred that the hydrogen rich recycle gas separated from the reformate effluent be first dried to a level below about 5 p.p.m. of water and preferably to a level not more than about 2 p.p.m. of water before combining the dried hydrogen rich recycle gas stream with the naphtha charge. While it is not absolutely essential that both the recycle gas and the naphtha charge be dried to such low levels as provided above it is preferred as a matter of choice and operating expedient to operate in this particular manner so that one can maintain the desired close control on the moisture level. On the other hand, drying the recycle gas with molecular sieve driers performs the dual function of removing other constituents such as chlorine and hydrogen sulfide from the gas. One can thus maintain much more conveniently in such an operation accurate and close control on the desired moisture-chloride level by the separate controlled additions thereof to the total charge passed to the first reforming zone of the plurality of reforming zones.

In the reforming of hydrocarbons with platinum group metal reforming catalysts, it is not unusual to employ a plurality of catalyst beds in three or more reactors in sequential arrangement through which the naphtha charge in combination with hydrogen rich recycle gas is passed under particularly selected reforming conditions to upgrade the naphtha to desired higher octane reformate product. In this sequence, temperature and pressure conditions are selected and maintained as required so that naphthene dehydrogenation to aromatics and dehydrocyclization and isomerization of paraffins may be accomplished to advantage in the sequence of reaction zones provided. Thus, it may be said that where there are three reaction zones in series, naphthene dehydrogenation is accomplished in a major proportion in the first reactor and in minor proportions in the second and third reactors with isomerization and dehydrocyclization reactions being effected to some extent in all catalyst beds but particularly downstream of the first catalyst bed. The reactions are accompanied by some hydrocracking in the second and third reaction zones. On the other hand in a reforming sequence comprising for example, four reaction zones, a major proportion of naphthene conversion may be accomplished in the first and second reaction zones with the remaining reactions of dehydrocyclization, isomerization and limited hydrocracking being accomplished in the third and fourth reaction zones. In accordance with one method of operation, the reforming conditions are selected so that the on-stream pressure is usually maintained below about 600 p.s.i.g. and is generally maintained at a pressure selected from within the range of from about 100 to about 350 p.s.i.g. In such a low pressure reforming operation it is not an unusual practice to employ a reduced pressure in the direction of flow of the reactants through the sequence of reforming zones amounting to no more than the pressure drop encountered by passage of the reactant through the catalyst beds piping and heater equipment provided. Reforming temperatures are maintained usually at the inlet to each reactor selected from within the range of from about 800° F. to about 1050° F. and most usually not exceeding about 1025° F. Adjustment of the reactant temperature between reactors is common practice as catalyst activity declines and most usually is accomplished in suitable furnaces provided. Generally, the pressure drop referred to above is such that the lead reactor or first reactor of the process may operate at a pressure which is from about 20 to about 100 p.s.i. higher than the pressure of the last reactor in the process. A weight hourly space velocity based on each reaction stage is usually selected from within the range of from about 0.5 to about 20 and sufficient hydrogen is provided with the hydrogen rich recycle gas to maintain a hydrogen partial pressure in the reforming process selected from within the range of from about 100 to about 300 p.s.i.a.

In the reforming of naphtha hydrocarbons boiling up to about 320° F. for the production of relatively high octane reformate product, it is not unusual to prefer to employ naphthas rich in naphthene since they are readily convertible to high octane aromatic constituents. However, one of the important findings of the present invention is that a naphtha charge rich in paraffins may also be converted to high octane reformate product in substantially improved yields in combination with maintaining a level of hydrogen purity which is above that obtainable heretofore with the more conventional non-bimetallic platinum catalyst comprising a higher percentage of the noble metal component. Thus it has now been found that when a naphtha charge is catalytically reformed in the presence of a bimetallic reforming catalyst such as platinum in combination with rhenium and promoted with chloride employing a total reactor pressure less than about 600 p.s.i.g. and preferably less than about 300 p.s.i.g., a significant increase in catalyst on-stream life is realized, the recycle gas hydrogen purity or hydrogen content of the recycle gas is significantly improved and the $C_5^+$ reformate product yield-octane relationship can be significantly improved when the moisture and chloride limit of the catalytic reforming operation is controlled within the limits herein defined.

In the reforming operation contemplated herein, the naphtha charge may be dried by any one of several different methods such as by means of percolation through a solid drying agent such as alumina, molecular sieves or contact with other solid absorbents or the naphtha may be effectively dried by distillation to provide a water content thereof usually less than about 10 to 15 p.p.m. by weight of water and preferably less than about 5 p.p.m. The recycle gas recovered from the effluent of the last reactor may be cooled and then dried by contact with a solid absorbent material such as a molecular sieve material or other suitable solid absorbent material. It is preferred that the recycle gas be contacted with the solid absorbent material under conditions to reduce the moisture content thereof to not more than about 2 p.p.m. by volume at 200 p.s.i.g.

The catalysts which may be employed with considerable success in a reforming operation under the operating conditions of this invention comprise catalysts containing metals of the platinum group, particularly platinum, palladium and rhodium in combination with one or more other metallic activating elements which form active catalyst complexes with a halogen promoter. Metallic activating agents or elements which may be employed with the platinum group metal include cerium, ruthenium, rhenium, yttrium and other elements which complex with halogen, for example, chlorine to form an active catalytic component. The concentration of platinum group metal providing the hydrogenation-dehydrogenation function of the catalyst composite will generally be selected from within the range of from about 0.01 to about 2% by weight but more usually will be selected from within the range of about 0.15 up to about 1% by weight. The metallic activating agent or metallic promoting component will be utilized on the other hand in relatively small amounts and thus comprise a small part of the total catalyst complex. Generally the metallic promoting component will be used in amounts which are equal to, more than, or less than the platinum group metal providing hydrogenation-dehydrogenation function. Thus the metallic promoting components may be used in amounts selected to be from about 0.05% up to about 2% of the amount of the platinum group metal component.

The metal components above identified are deposited on a suitable carrier material which is usually an inorganic metal oxide and preferably is alumina in the gamma or eta form and/or mixtures thereof. The carrier may be combined with other elements of the periodic table including zirconia, magnesia and titania. A suitable carrier material may be silica-alumina, silica-magnesia, silica-alumina-zirconia and alumina silicates. The acidic function of the catalyst may be provided by halogen combined therewith. The halogen may be incorporated with the catalyst by any number of suitable methods. For example, it may be added during preparation by using chloroplatinic acid or it may be added in the elemental gas form as chlorine or fluorine. It may also be added separately or with the naphtha charge stream as an organic or inorganic halide as, for example, methylchloride, ammonium chloride, carbon tetrachlorine, hydrochloride acid, chloroform or other suitable compositions. The halogen content of the catalyst can be varied over considerably wide limits and may be in the range of from about 0.01 up to as high as 10% by weight but more usually is maintained at less than about 5% by weight and at least equal to the weight percent of the platinum group metal.

The overall activity and selectivity of a conventional platinum group metal reforming catalyst can be significantly improved. This improvement can be acquired through the use of a metal activator which complex with halogen in significant amounts in combination with the platinum group metal forms a highly active catalyst complex. The performance of the catalyst complex is greatly enhanced when the metal activating agent and chloride level of the catalyst is within the particular limits herein identified.

Example 1

A naphtha charge material boiling in the range of $C_6$ hydrocarbons up to about 330° F. end point was reformed by contact with a reforming catalyst comprising about 0.35% platinum by weight, 0.35% by weight of rhenium deposited upon alumina carrier and promoted with about 1% by weight of chloride based upon fresh catalyst. The catalyst fill ratio employed in a 3 reactor reforming operation was 0.3/0.5/1.0 relationship. Reforming of the naphtha charge was effected at a pressure of about 250 p.s.i.g. and a liquid hourly space velocity of about 1.5 v./hr./v. under operating severity conditions of temperature to produce a 102.5 R+3 octane product material in the reforming operation. Thus defined, an initial operating period was effected in the presence of 4 p.p.m. of water as measured in the recycle effluent was made and then the amount of water was raised to about 10 p.p.m. as measured in a reformate recycle effluent. The table below presents the results obtained during this operation:

| | 4 p.p.m. water | 10 p.p.m. water |
|---|---|---|
| Recycle $H_2$, percent mol | 70.0 | 73.2 |
| $C_5^+$ reformate percent volume | 71.5 | 72.7 |

Example 2

In this example the conditions of operation and the catalyst employed were the same as identified above in Example 1, except that as chloride was increased from 0 up to 3 p.p.m. there was increased catalytic activity, but no change in product yield was observed. The reforming operation was continued, but in the presence of 12 p.p.m. of water and 3 p.p.m. of chloride for a period of time without any decline in yield, and then the chloride level was raised to 5 p.p.m. while retaining the level of water as initially used, that is, 12 p.p.m. of water. Quite unexpectedly this further increase in chloride level produced a further significant increase in product yield. The table below presents the results obtained during this further significant chloride addition.

|  | 12 p.p.m. $H_2O$ plus 3 p.p.m. chloride | 12 p.p.m. $H_2O$ plus 5 p.p.m. chloride |
|---|---|---|
| Recycle $H_2$, percent mol | 73.0 | 75.0 |
| $C_{5+}$ reformate percent volume | 73.0 | 74.1 |

Example 3

In a separate reforming operation such as defined in Example 1, except that the chloride level was raised to 5 p.p.m. but the water content was maintained below 5 p.p.m. as in Example 1, the yield of $C_{5+}$ reformate product did not exceed the values identified for the 4 p.p.m. water run of Example 1. It is thus seen that chloride control alone, without a simultaneous control of the water level of the reforming operation is not enough to achieve the improvement obtainable with water control alone or in combination with chloride control.

From the examples presented above it is clear beyond any reasonable doubt that a bimetallic reforming catalyst can be operationally improved with respect to product selectivity by carefully controlling the moisture level alone of the catalytic reforming operation within fairly narrow limits. It has also been shown by the examples that a further significant improvement in product yields can be obtained provided the chloride level of the catalytic reforming operation is controlled in conjunction with maintaining a relatively specific level of moisture in the catalyst environment of the reforming operation.

Having thus provided a general description of the method of this invention and provided support therefor with specific examples it is intended that no undue restrictions be imposed by reason thereof except as provided for in the following claims.

We claim:

1. A method for reforming a gasoline boiling range naphtha charge material with a bimetallic reforming catalyst comprising a platinum group metal in combination with a metal halogen complex selected from the group consisting of rhenium, ruthenium, cerium and yttrium which comprises carrying out the reforming of naphtha charge with said catalyst in a plurality of sequentially arranged catalyst beds, maintaining the reforming temperature of the individual catalyst beds under temperature conditions particularly selective for effecting dehydrogenation of naphthenes, isomerization and cyclization of paraffins when employing pressure conditions in the range of from about 100 p.s.i.g. up to about 600 p.s.i.g., limiting the amount of moisture in contact with the catalyst during the reforming operation by controlling the moisture level of the reactants within the range of 8 to 20 p.p.m. of water as measured in the effluent recycle gas, and substantially optimizing the $C_{5+}$ reformate yield-octane relationship, by controlling the chloride level of the catalyst atmosphere in at least the catalyst bed downstream of the initial catalyst bed by injecting a chloride compound in an amount sufficient to maintain the ratio of chloride to water such that 4.0 p.p.m. by weight of chloride is provided for every 10 p.p.m. of water.

2. The method of claim 1 wherein the reforming temperature is selected from within the range of 800 to about 1050° F. and the pressure is below about 600 p.s.i.g. and preferably below 350 p.s.i.g.

3. The method of claim 1 wherein the chloride level of the catalyst is controlled in all catalyst beds by the addition of chloride to the reactant materials entering the first bed of catalyst.

4. The method of claim 1 wherein the chloride water ratio relationship is measured in the effluent recycle gas and required chloride additions are made to the reactants entering the second bed of catalyst in the sequence of catalyst beds.

References Cited

UNITED STATES PATENTS

| 2,911,358 | 11/1959 | Leigh et al. | 208—139 |
| 2,952,611 | 9/1960 | Haxton et al. | 208—65 |
| 2,969,319 | 1/1961 | Sosnowski et al. | 208—139 |
| 3,234,120 | 2/1966 | Capsuto | 208—138 |
| 3,287,253 | 11/1966 | McHenry et al. | 208—139 |
| 3,296,118 | 1/1967 | Czajkowski et al. | 208—138 |
| 3,330,761 | 7/1967 | Capsuto et al. | 208—138 |
| 3,415,737 | 12/1968 | Kluksdahl | 208—138 |

HERBERT LEVINE, Primary Examiner

U.S. Cl. X.R.

208—65